Patented Feb. 5, 1935

1,990,215

UNITED STATES PATENT OFFICE 1,990,215

POLYMERIZATION OF RESINS

George Kenneth Anderson, Pittsburgh, Pa., assignor to The Neville Company, a corporation of Pennsylvania No Drawing. Application July 5, 1933, Serial No. 679,085

6 Claims. (Cl. 260—7)

This invention relates to the polymerization of coumarone type resin.

It is important for certain purposes that coumarone resin have a high degree of solubility in the solvents of commercial grade, such as coal tar naphtha, petroleum distillates, and hydrogenated petroleum solvents, employed as solvents for the resin in the manufacture of paint and varnish bases. The problem is to so conduct a polymerization process for production of the resin that an otherwise high grade of resin having a high degree of solubility is produced. One method of improving the solubility of coumarone resin over that obtained by standard methods of bulk polymerization is disclosed and claimed in my copending application, Serial No. 592,854, filed February 13, 1932 now Patent 1,922,342. The present invention constitutes an improvement in the control of the polymerizing reaction, with a consequent improvement in certain qualities of the resin produced.

While it is unnecessary to detail the steps by which I arrived at my conclusion, I have discovered that if the catalyst, preferably sulphuric acid, be in a state of fine dispersion in a diluent, the actual reaction time may be controlled, and a control of the solubility of the resin may be obtained. The fine dispersion of catalyst in a prepared bath creates conditions generally favorable to the control of a polymerizing reaction of this nature, and of itself tends to modify the polymerizing reaction resulting from running sulphuric acid into a batch containing the polymerizable bodies. The fact, namely, that the particularly fine dispersion of the catalyst leads to an improvement in the qualities of the resin produced, I have established by a succession of tests. The corollary control of reaction time can be effected, so far as I am aware, only by the fine and intimate dispersion of the catalyst.

It should be understood that "reaction time" I may roughly define as the total period during which polymerizable but unpolymerized bodies are brought into contact with the catalyst.

It is, of course, true, and is expressed in the prior art, that a lengthened reaction time, accompanied by some retardation in the rate of addition in the formation of polymers, may be obtained by running a dilute catalyst slowly into a lean starting material, that is, a starting material containing a relatively small percentage of polymerizable bodies. Such practice is, however, inefficient, in that the resulting resin production is small for the size of batch employed. While such procedure as that noted may to some degree extend the reaction time, and to some extent decrease the rate of polymerization, it does not give a control of reaction time, and does not uniformly decrease or make controllable the rate of addition in the polymerizing action.

In my above-noted pending application, successive relatively small charges of catalyst and material containing the polymerizable bodies are added successively to a relatively large body of diluent, until a resin content of substantial quantity has been built up in the blend. This method may be considered successful in producing a coumarone resin of good solubility, and apparent relative uniformity in molecular structure. It does not, however, provide a definite control of the reaction time and rate of polymerization.

I have found that the fine dispersion of acid through a body of diluent, and the contact of material containing the polymerizable bodies with the mixture containing the acid in a fine state of dispersion, also provides a reaction in which a relatively small quantity of polymerizable bodies are exposed to the action of the catalyst at any one time, and additionally permits a relatively accurate control of such quantity of polymerizable bodies throughout the time of reaction.

It may be initially understood that if polymerizable bodies be supplied to an activated bath containing a fine dispersion of catalyst in an inert liquid at a slow rate of supply, the reaction time may be made to coincide approximately to the period of supply of the polymerizable bodies. If the rate of supply be relatively rapid, the reaction time will be somewhat longer than the period of supply.

As a general example of my polymerizing procedure, I first effect the dispersion of a liquid catalyst, preferably sulphuric acid, in a body of diluent, by violently agitating the acid therein. Taking into consideration the volume of the liquid containing polymerizable bodies as well as the volume of diluent, a volume of 66° sulphuric acid equal to from about 1% of the total volume of resin forming liquid and diluent to 5% of such volume may, according to my experience, be used.

I have effected polymerization with a minimized quantity of sulphuric acid. I have used as much as 5% of 66° sulphuric acid with respect to the total volume of other liquids.

As a diluent I know that a hydrocarbon distillate, such as petroleum distillate or refined naphtha, may be used. These distillates are inert under the conditions of the process, and serve to some extent as selective solvents for the resinous polymers which are formed. Of the two classes, I prefer the petroleum distillates as lending themselves more readily to reaction control, being more selective as solvents of the resinous polymers, and as facilitating the steps of resin recovery subsequent to polymerization.

After the acid has been thoroughly dispersed through the body of diluent, and not before thorough dispersion, I begin the addition of the liquid which contains the polymerizable bodies. This liquid is desirably a crude solvent naphtha containing a determined percentage of polymer-forming bodies, but may be some other liquid obtained from the distillation of coal, which contains equivalent bodies.

The liquid containing the polymerizable bodies is added gradually—desirably in a running stream—and its rate of supply is controlled throughout the period of its supply. The period of supply of the liquid containing the polymerizable bodies is varied roughly in accordance with the desired characteristics of the resin to be produced, taking into consideration the concentration of the polymer-forming bodies in the liquid, together with the volume ratio of this polymer-producing liquid, or starting liquid to the diluent.

I have taken, for example, 900 gallons of starting material containing 53% of polymerizable bodies, and made the ratio of this liquid to diluent 1:3. Using sulphuric acid for polymerization, in this instance about 1.7% 66° acid, the period of supply of the starting liquid to the prepared, activated, bath was approximately six minutes, and the bath was precooled to −18° C. The resulting resin possessed a melting point of 126° C. and a precipitation temperature of 16° C. from Stoddard solvent naphtha. It may be noted that in this example the reaction time was but slightly longer than the period of supply, about 90% of the temperature rise having taken place during the six-minute period of supply.

The foregoing may be considered as typifying a highly useful aspect of the invention, giving a melting point adequately high for most purposes, with very good solubility and a yield adequately high for commercial practice.

Returning to the general conditions of the process, temperature control seems to be with my method of less importance than is the case with a method in which acid is run into a batch containing polymerizable bodies. It is important, however, that the activated bath be precooled, or that heat abstracting conditions be maintained throughout the period of reaction. It is desirable that there be agitation to mechanically disperse the added liquid containing the polymerizable bodies through the activated bath. It is a fact that the crude solvent naphtha will tend to disperse of its own accord through the body of the bath; and, the acid being finely dispersed, the tendency for intense local action to occur is lessened. If, however, reaction time be made relatively short, agitation becomes of increased importance.

Following the polymerizing reaction, the liquid is decanted from the precipitate and washed free of the polymerizing agent and remaining impurities. It is distilled. The resinous material in the still is then steamed for the removal of heavy oils, and the remaining resinous residue constitutes the desired solid resins. These recovery steps, subsequent to polymerization, are in accordance with previously known procedure.

It has been known that a resin of fair solubility, but of low melting point, might be obtained by using a starting liquid, which is particularly lean or by operating in particularly high dilution. I have, however, discovered in practice that controlling the reaction time by control of the rate of supply of the liquid containing polymerizable bodies, I am able to obtain a resin of relatively high melting point and good solubility.

As an example, I have taken a crude solvent naphtha containing approximately 45% of polymerizable bodies, and have apportioned this in the ratio of one volume of this starting liquid to three volumes of petroleum distillate. I used as a catalyst 66° sulphuric acid in a volume of 1.10%, the combined volume of crude solvent naphtha and petroleum distillate. The acid was dispersed thoroughly in the diluent, to provide an activated bath prior to the introduction of the crude solvent naphtha. The bath was precooled to a temperature of −16° C. The crude solvent naphtha was run into the bath with agitation at a rate of supply giving a period of supply of three minutes, which gave a reaction time of eight minutes. The resulting resin has a melting point of approximately 154° C. and a precipitation temperature from Stoddard solvent naphtha of approximately 29° C.

The surprising feature illustrated by this example is the possibility of producing a coumarone resin of such high melting point, which has also such notably good solubility.

As an extreme example of the production of low melting-point resin, I have taken crude solvent naphtha of about 55% polymerizable content, and by extending the period of supply, and the coincident reaction time through a period of one hour and ten minutes I have obtained a resin having a melting point of 85° C. and a precipitation from Stoddard solvent naphtha at 10° C. The initial bath temperature was 35° C., and the volume of acid was 0.9% 66° sulphuric acid.

An incident to such extreme example is that a relatively low yield of solid resin is obtained, and that there is an accompanying formation of a relatively great quantity of heavy oil, which may be considered as the product of one of the initial stages of polymerization. This heavy oil is itself a valuable product.

It will be readily understood from the above that, wholly aside from any theory of polymerization, my invention consists primarily in the use of a preformed bath of diluent and catalyst, with the catalyst finely and thoroughly dispersed in the bath, and, secondarily, in the addition of liquid containing polymerizable bodies to this bath at a controlled rate of supply.

It should be understood that the formation of an activated bath of inert diluent and catalyst is in itself of primary merit. By preparing such an activated bath, and running the liquid containing the polymerizable bodies into it even rapidly, I have been able to produce coumarone resin having a solubility better than would result under otherwise similar conditions, by adding the acid to a batch of diluent and liquid containing the polymerizable bodies. In order to obtain the advantage of the activated bath under such circumstances, it is necessary that the rate of supply of the liquid containing the polymerizable bodies be sufficiently retarded, or gradual, and the agitation be such as to cause dispersion of this liquid through the bath containing the dispersed acid. That is, the rate of supply must be sufficiently slow, and the agitation adequate to prevent intense action in any region of the bath.

In testing the solubility of the resin by precipitation from Stoddard solvent naphtha, I make a 20% solution by weight of the resin in the solvent, and cool back to the temperature at which precipitation occurs.

I claim as my invention:

1. In the bulk production of coumarone resin by catalytic polymerization the herein described polymerization method which comprises preparing in advance an activated bath by thoroughly dispersing a catalyst in a body of liquid diluent which is inert to the polymerizing reaction and which is a solvent for the resultant resin but in which the catalyst is insoluble, establishing heat abstracting conditions for the activated bath, and gradually adding to and dispersing in said activated bath a charge of liquid containing bodies polymerizable into coumarone resin, the said liquid containing the resin-forming bodies being added at a rate adequately slow to produce intimate immediate distributed contact as the liquid is added between the insoluble catalyst and the resin-forming bodies.

2. A process in accordance with claim 1 in which the inert liquid diluent a solvent for the resultant resin is a refined liquid hydrocarbon derived from the distillation of coal and the catalyst is sulphuric acid.

3. A process in accordance with claim 1 in which the inert liquid diluent a solvent for the resultant resin is a petroleum distillate and the catalyst is sulphuric acid.

4. In the bulk production of coumarone resin by catalytic polymerization the herein described polymerization method which comprises preparing in advance an activated bath by thoroughly dispersing in a body of liquid diluent which is inert to the polymerizing reaction and which is a solvent for the resultant resin but in which sulphuric acid is insoluble, sulphuric acid as a catalyst for polymerization, said sulphuric acid being apportioned to the volume of inert liquid diluent to provide an active content of catalyst in the bath not substantially greater than that resulting from dispersion in the diluent of a volume of 66° Baumé sulphuric acid equal to five per cent. the volume of inert liquid diluent, and adding to and dispersing in the bath liquid containing bodies polymerizable into coumarone resin.

5. A process in accordance with claim 4 in which the inert liquid diluent a solvent for the resultant resin is a refined liquid hydrocarbon derived from the distillation of coal.

6. A process in accordance with claim 4 in which the inert liquid diluent a solvent for the resultant resin is a petroleum distillate.

GEORGE KENNETH ANDERSON.